(12) United States Patent
Bercea

(10) Patent No.: US 12,086,993 B2
(45) Date of Patent: *Sep. 10, 2024

(54) TRACKING OF MULTIPLE OBJECTS IN COOPERATION WITH MULTIPLE NEURAL NETWORKS

(71) Applicant: Robert Bosch GmbH, Stuttgart (DE)

(72) Inventor: Cosmin Ionut Bercea, Haar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 345 days.

This patent is subject to a terminal disclaimer.

(21) Appl. No.: 17/696,024

(22) Filed: Mar. 16, 2022

(65) Prior Publication Data

US 2022/0309680 A1    Sep. 29, 2022

(30) Foreign Application Priority Data

Mar. 25, 2021 (DE) ..................... 10 2021 202 933.7

(51) Int. Cl.
*G06T 7/20* (2017.01)
*G06F 9/54* (2006.01)
*G06N 3/045* (2023.01)

(52) U.S. Cl.
CPC .............. *G06T 7/20* (2013.01); *G06F 9/544* (2013.01); *G06N 3/045* (2023.01);
(Continued)

(58) Field of Classification Search
CPC ............. G06T 7/20; G06T 2207/20084; G06T 2207/30236; G06T 2207/30252;
(Continued)

(56) References Cited

U.S. PATENT DOCUMENTS 11,748,615 B1 * 9/2023 Wu .......................... G06N 3/08
706/25
11,961,298 B2 * 4/2024 Zhu ...................... G06V 10/776
(Continued)

FOREIGN PATENT DOCUMENTS

DE      102017223206 A1    6/2019

OTHER PUBLICATIONS

Bercea, C.I., Pauly, O., Maier, A., Ghesu, F.C. (2019). SHAMANN: Shared Memory Augmented Neural Networks. In: Chung, A., Gee, J., Yushkevich, P., Bao, S. (eds) Information Processing in Medical Imaging. IPMI 2019. Lecture Notes in Computer Science, vol. 11492. Springer, Cham. https://doi.org/10.1007/978-3-030-203.*
(Continued)

*Primary Examiner* — Xuemei G Chen
(74) *Attorney, Agent, or Firm* — NORTON ROSE FULBRIGHT US LLP; Gerard A. Messina

(57) ABSTRACT

A method for tracking and/or characterizing multiple objects in a sequence of images. The method includes: assigning a neural network to each object to be tracked; providing a memory shared by all neural networks, and designed to map an address vector of address components, via differentiable operations, onto one or multiple memory locations, and to read data from these memory locations or write data into these memory locations; supplying images from the sequence, and/or details of these images, to each neural network; during the processing of each image and/or image detail by one of the neural networks, generating an address vector from at least one processing product of this neural network; based on this address vector, writing at least one further processing product of the neural network into the shared memory, and/or reading out data from this shared memory and further processing the data by the neural network.

12 Claims, 2 Drawing Sheets

(52) U.S. Cl.
CPC .............. *G06T 2207/20084* (2013.01); *G06T 2207/30236* (2013.01); *G06T 2207/30252* (2013.01)

(58) Field of Classification Search
CPC . G06T 2207/10028; G06T 2207/30196; G06T 2207/30232; G06T 2207/30241; G06T 7/246; G06F 9/544; G06N 3/045; G06N 3/0442; G06N 3/09; G06N 3/084; G06N 3/0464
See application file for complete search history.

(56) References Cited

U.S. PATENT DOCUMENTS

| | | | | |
|---|---|---|---|---|
| 2019/0347792 | A1* | 11/2019 | Pauly | G06T 7/136 |
| 2020/0126241 | A1* | 4/2020 | Wang | G06N 3/048 |
| 2020/0279393 | A1* | 9/2020 | Wolf | G06T 3/4046 |
| 2021/0082128 | A1* | 3/2021 | Okada | G06T 7/74 |
| 2021/0104071 | A1* | 4/2021 | Shao | G06T 7/97 |
| 2021/0142078 | A1* | 5/2021 | Evans | G05D 1/0246 |
| 2021/0224564 | A1* | 7/2021 | Xu | G06V 20/64 |
| 2021/0295534 | A1* | 9/2021 | Cho | G06T 7/11 |
| 2022/0138493 | A1* | 5/2022 | Lee | G06V 10/26 382/103 |
| 2022/0223285 | A1* | 7/2022 | Hirsch | G06T 7/0012 |
| 2022/0383082 | A1* | 12/2022 | Zhang | G06N 3/045 |
| 2024/0078427 | A1* | 3/2024 | Taghia | G06N 3/08 |

OTHER PUBLICATIONS

Jun Song et al. "Local-Global Memory Neural Network for Medication Prediction" IEEE Transactions on Neural Networks and learning Systems, vol. 32, No. 4, Apr. 2021. 14 Pages.

Long short-term memory, https://de.wikipedia.org/w/index.php?title=Long_short-term_memory. 6 pages.

* cited by examiner

TRACKING OF MULTIPLE OBJECTS IN COOPERATION WITH MULTIPLE NEURAL NETWORKS

FIELD

The present invention relates to the tracking of objects in image sequences that may represent a traffic situation, for example.

BACKGROUND INFORMATION

In order for a vehicle to be able to move at least partially automatedly in traffic, it is necessary to detect the surroundings of the vehicle and initiate countermeasures in the event of an imminent collision with an object in the surroundings of the vehicle. In addition, the creation of a representation of the surroundings and localization are necessary for safe automated driving.

The surroundings of the vehicle are typically observed using at least one sensor, and based on the recorded measured data, the objects that are discernible from same are classified using a trained machine learning model. For moving objects, it is likewise important to know the trajectory the object is following. German Patent Application No. DE 10 2017 223 206 A1 describes a device that ascertains linear trajectories of objects with the aid of an artificial neural network.

Tracking of objects is also important within the scope of video monitoring of areas.

SUMMARY

Within the scope of the present invention, a method for tracking and/or characterizing multiple objects in a sequence of images is provided.

The concept of an image is not limited to camera still images, and also includes video images, radar images, LIDAR images, or thermal images, for example.

In accordance with an example embodiment of the present invention, the method begins with assigning a neural network to each object to be tracked. For example, at the start of the image sequence, the various objects contained in the image may be recognized using an arbitrary method, for example via classification and/or (semantic, for example) segmentation. A neural network may then be applied in each case to each of these objects in the manner of an "agent." Each neural network is thus concerned only with tracking or identifying the object assigned to it, and/or obtaining further information concerning the behavior or other sought properties of this object.

In accordance with an example embodiment of the present invention, a memory that is shared by all neural networks is provided. This memory is designed to map an address vector of address components, via differentiable operations, onto one or multiple memory locations, and to read data from these memory locations or write data into these memory locations. This shared memory, for example in combination with each individual neural network, may in particular form a so-called "differentiable neural computer" (DNC). The neural networks are then formed into a grouping made up of many such DNCs that share the memory.

Images from the sequence and/or details of these images are supplied to each neural network. For example, in particular the image details may be selected in such a way that they each contain previously identified objects. During the processing of each image and/or image detail by one of the neural networks, an address vector is generated from at least one processing product of this neural network. Based on this address vector, at least one further processing product of the neural network is written into the shared memory, and/or data are read out from this shared memory and further processed by the neural network.

As output, each neural network delivers positions of the particular assigned object in the images or image details supplied to it, and/or information concerning the behavior or other sought properties of the particular assigned object.

For example, assuming that an object at the start of the image sequence has been recognized merely as a separate object not identified in greater detail, over the course of the image sequence this object is identified more and more precisely in a stepwise manner. Thus, for example, a pedestrian may be initially recognized just as a pedestrian, then as a child, and ultimately as a boy or girl.

The analysis of the behavior of the object does not have to be limited to the trajectory of the object, and instead may also include, for example, gestures, facial expressions, and other behavior patterns of a pedestrian. Such behavior patterns may also be used, for example, for a prediction of whether the pedestrian will remain on the sidewalk or, for example, make an attempt to cross the roadway.

It has been found that the simultaneous tracking of multiple objects in an image sequence is particularly difficult in analyzing traffic situations. On the one hand, in such settings, individual objects may be temporarily completely or partially concealed. On the other hand, the trajectories of various objects, such as various pedestrians in a group of people, may overlap. Therefore, it is advantageous to apply a neural network to each object to be tracked. For example, if one pedestrian is now briefly concealed, this has no effect on the tracking of the remaining pedestrians, who are still fully visible.

Thus far, however, the individual tracking of objects is achieved at the cost of losing the information about the overall context of the situation. Due to the shared memory, an option is provided of retaining this overall context. In the stated example of a group of people, or also in a line of vehicles, the movements of road users are not completely independent, but, rather, are correlated. When such a correlation is taken into account, the accuracy of the output ascertained using each neural network may be further improved.

In this regard, the use of a memory, which together with a neural network forms a differentiable neural computer, is particularly advantageous. The exchange of relevant information concerning the shared memory may then be seamlessly integrated into the training of the particular neural networks. The differentiability of the operations via which the address vector is evaluated then ensures that during supervised learning, the error, ascertained from a comparison of the output to a "ground truth" known in advance, may be backpropagated by the particular neural network in the form of gradients of the parameters that characterize the behavior of the particular neural network. Thus, the access to the shared memory does not act as a "dam" that cannot be overcome in the reverse direction.

For example, if a first neural network stores a piece of information in the shared memory that may be helpful for the tracking of some other object by a second neural network, the performance of the second neural network that is measured using a cost function (loss function) is better, the more of this information that is taken into account by the second neural network in the further processing. Due to the differentiable evaluation of the address vector in the memory, a portion of the stated useful information already passes into the second neural network, when the memory address from which the second neural network retrieves data merely approximates that memory address at which the first neural network has stored the useful information. Thus, during the training there is feedback such that the performance is improved when the address retrieved by the second neural network further approximates the address written by the first neural network. This written address may likewise vary during the optimization.

Overall, an information exchange between various neural networks may thus develop during the joint training of the multiple neural networks, without it having to be known in advance which pieces of information compiled in a neural network may now be helpful for which other neural networks.

The essence of the method is that the trackings of independent objects in a setting, in the present case in particular in a traffic situation, are not so independent from one another as it might first appear. Instead, there are synergy effects that may be utilized, using the shared memory, in order to obtain more accurate information concerning all objects that are present and their movement.

In one particularly advantageous embodiment of the present invention, the processing product from which the address vector is generated represents visual features that are recognized in the object to be tracked. For example, the neural network may include a sequence of convolution layers in which one or multiple feature maps, each with greatly reduced dimensionality, are generated in each case by applying one or multiple filter kernels. The feature maps in the first convolution layer may then indicate the presence of certain basic visual features in the image or image detail, while the feature maps in further convolution layers indicate the presence of more complex visual features.

The shared memory may be designed in particular, for example, as an associative memory in which data are storable in association with processing products of the neural networks. This is somewhat analogous to databases that assign a certain value to a certain key (in the present case, the processing product). Such a structure does not initially require that the particular information, whose exchange between the neural networks is particularly advantageous, be known in advance. However, if appropriate information of whatever kind is known in advance, it may be utilized. For example, the neural networks may exchange information with one another concerning the type of object they are tracking in each case, and/or which specific instance of multiple present objects of this type they are tracking in each case.

In this regard, previous knowledge may be introduced, for example, in that within the scope of providing, the associative memory is pre-populated with identifications of objects and/or with data that characterize the behavior or other sought properties of objects. It is not necessary to predefine a specific association with any processing product. Thus, for example, the identifications or data may be present simply as a list in the associative memory, and when a neural network, for example, believes to have recognized, for example, an object with a certain identification, it may associate this identification, already present in the memory, with a certain processing product formed by this network. For example, in a list of 10 numerical identifications from 1 to 10, for object instances for which initially there is no reference in each case, it may be noted by a neural network that certain visual features are a strong indication that the tracked object is object instance number 6.

In a further advantageous embodiment of the present invention, during the further processing, a neural network combines the data read out from the shared memory with at least one processing product of this neural network. It is taken into account that, although the data in the shared memory may contain information about commonalities between the tracked objects and about the observed setting as a whole, these data cannot completely replace the tracking of an object by a neural network applied to this object.

In a further particularly advantageous embodiment of the present invention, at least one first neural network and one second neural network contain mutually corresponding sequences of layers in which the particular neurons or other processing units of the particular neural network are organized. The first neural network writes a processing product from a first layer into one or multiple memory locations of the shared memory. The second neural network reads data from this/these memory location(s) and further processes the data in a second layer that follows the first layer in the sequence. The reuse of the data in the second neural network is thus facilitated, since the data are present in the exact format and dimensionality required by the second layer.

For example, if it is provided in both neural networks in each case that the output of layer number 5 is led as input into layer number 6, the first neural network may store a processing product, formed in layer number 5, in the shared memory. The second neural network may then retrieve this processing product from the shared memory, and optionally combined with a processing product that is generated in this second neural network itself, supply it to its layer number 6.

As explained above, in particular for example an image sequence containing images of a traffic situation that has been recorded using at least one sensor that is carried along by a vehicle may be selected. In particular in traffic situations, there are many objects for which, although they are independent of one another, their movements may be correlated to a certain extent. In particular, for example the outputs of the neural networks may then be combined into an overall assessment of the traffic situation.

In particular, for example an activation signal for the vehicle may be generated from the outputs of the neural networks and/or from the overall assessment of the traffic situation generated therefrom. The vehicle may be subsequently activated using this activation signal. Due to the improved accuracy with which the neural networks in each case ascertain positions and information concerning the behavior or other properties of objects, the likelihood is then increased that the action triggered by the activation (such as an evasive maneuver or a brake application) is appropriate for the sequence of images of the observed traffic situation.

In a further application example, a sequence containing images that have been recorded during the visual observation of a monitored area is selected. By tracking the positions and/or the behavior of recognized objects, conclusions may be drawn, for example, concerning the intentions of persons present in the monitored area. Thus, for example, a person who is passing by may be distinguished from a person who is searching for a locality in a focused manner.

The method may in particular be implemented completely or partially by computer. Therefore, the present invention further relates to a computer program that includes machine-readable instructions which, when executed on one or multiple computers, prompt the computer(s) to carry out the described method. In this sense, control units for vehicles and embedded systems for technical devices which are likewise capable of executing machine-readable instructions are also to be regarded as computers.

Moreover, the present invention further relates to a machine-readable data medium and/or a download product that includes the computer program. A download product is a digital product that is transferable via a data network, i.e., downloadable by a user of the data network, and that may be offered for sale in an online store, for example, for immediate download.

In addition, a computer may be equipped with the computer program, the machine-readable data medium, or the download product.

Further measures that enhance the present invention are described in greater detail below with reference to figures, together with the description of the preferred exemplary embodiments of the present invention.

DETAILED DESCRIPTION OF EXAMPLE EMBODIMENTS

Figure 1:
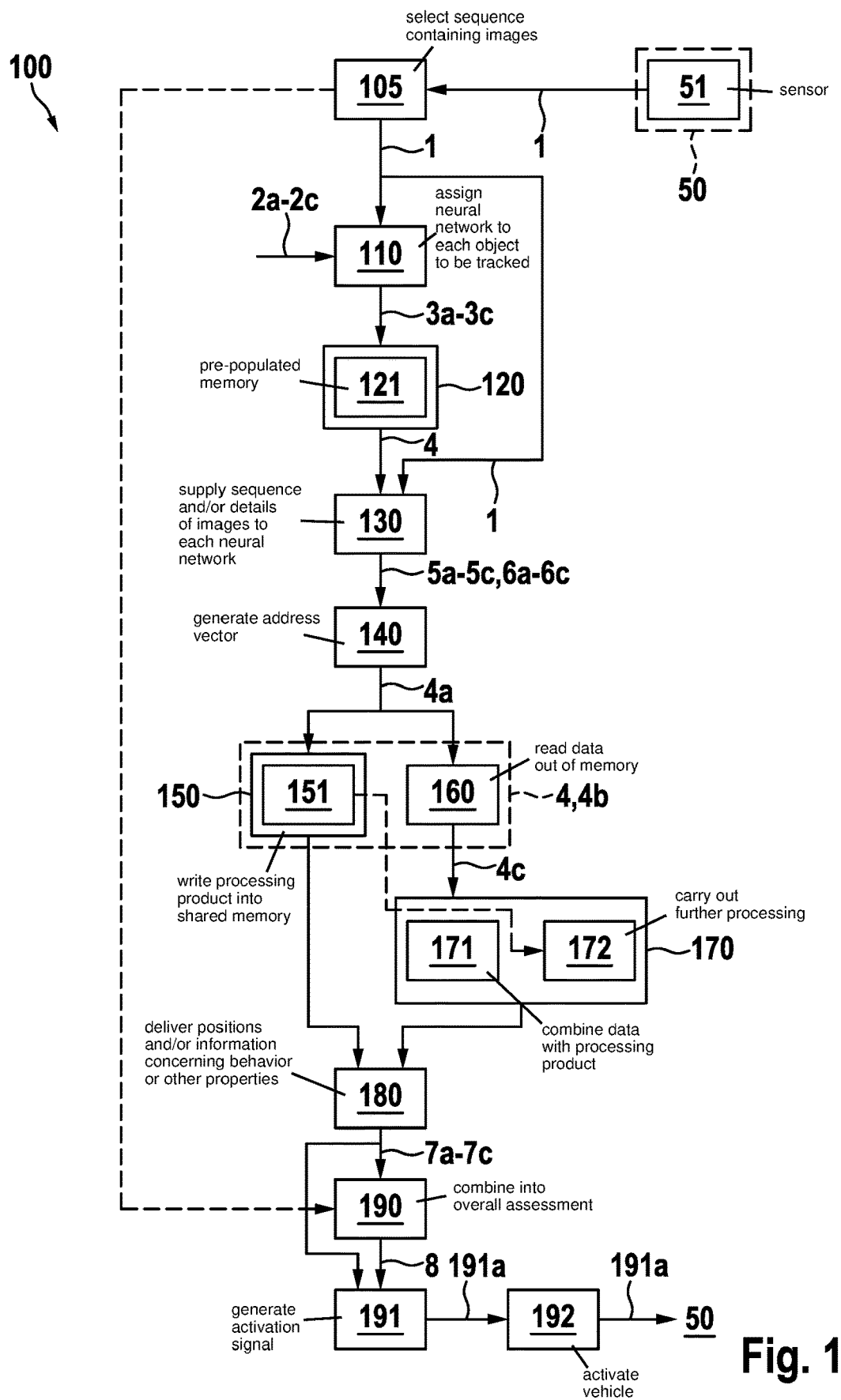
FIG. 1 shows one exemplary embodiment of method 100 for tracking and/or characterizing objects 2a through 2c, in accordance with the present invention.

FIG. 1 is a schematic flowchart of one exemplary embodiment of method 100 for tracking and/or characterizing objects 2a through 2c based on a sequence of images 1. A sequence containing images 1 of a traffic situation is optionally selected in step 105. Images 1 have been recorded using at least one sensor 51 that is carried along by a vehicle 50.

A neural network 3a through 3c is assigned to each object 2a through 2c to be tracked, in step 110. As explained above, for example objects 2a through 2c to be tracked may be discerned in first image 1 of the sequence without an analysis being made of the particular type of object 2a through 2c.

A memory 4, including memory locations 4b, that is shared by all neural networks 3a through 3c is provided in step 120. According to block 121, this memory 4 may already be pre-populated with identifications of objects 2a through 2c and/or with data that characterize the behavior or other sought properties of objects 2a through 2c.

Images 1 from the sequence and/or details of these images are supplied to each neural network 3a through 3c in step 130. During the processing of each image 1 and/or image detail by one of neural networks 3a through 3c, an address vector 4a is generated from at least one processing product 5a through 5c of this neural network 3a through 3c in step 140. Due to the structural design of memory 4, this address vector 4a is mapped onto memory locations 4b via differentiable operations, and may be utilized in two ways.

At least one further processing product 6a through 6c of neural network 3a through 3c is written into shared memory 4, based on address vector 4a, in step 150. According to block 151, this processing product 6a through 6c may originate from a first layer of a first neural network 3a that is organized in layers.

Alternatively or also in combination therewith, data 4c are read out from memory 4 in step 160, and these data are further processed by neural network 3a through 3c in step 170. According to block 171, this further processing may in particular involve, for example, combining data 4c with at least one processing product of this neural network 3a through 3c. According to block 172, the further processing may be carried out in a second neural network 3b in a second layer that follows the first layer, from which data 4c have been taken according to block 151.

As output 7a through 7c, each neural network 3a through 3c delivers positions of particular assigned object 2a through 2c in images 1 or image details supplied to it, and/or information concerning the behavior or other sought properties of particular assigned object 2a through 2c, in step 180.

Outputs 7a through 7c of neural networks 3a through 3c may be combined into an overall assessment 8 of the traffic situation in step 190.

An activation signal 191a for vehicle 50 may be generated from outputs 7a through 7c of neural networks 3a through 3c, and/or from overall assessment 8 of the traffic situation generated therefrom, in step 191. Vehicle 50 may be activated using this activation signal 191a in step 192.

Figure 2:
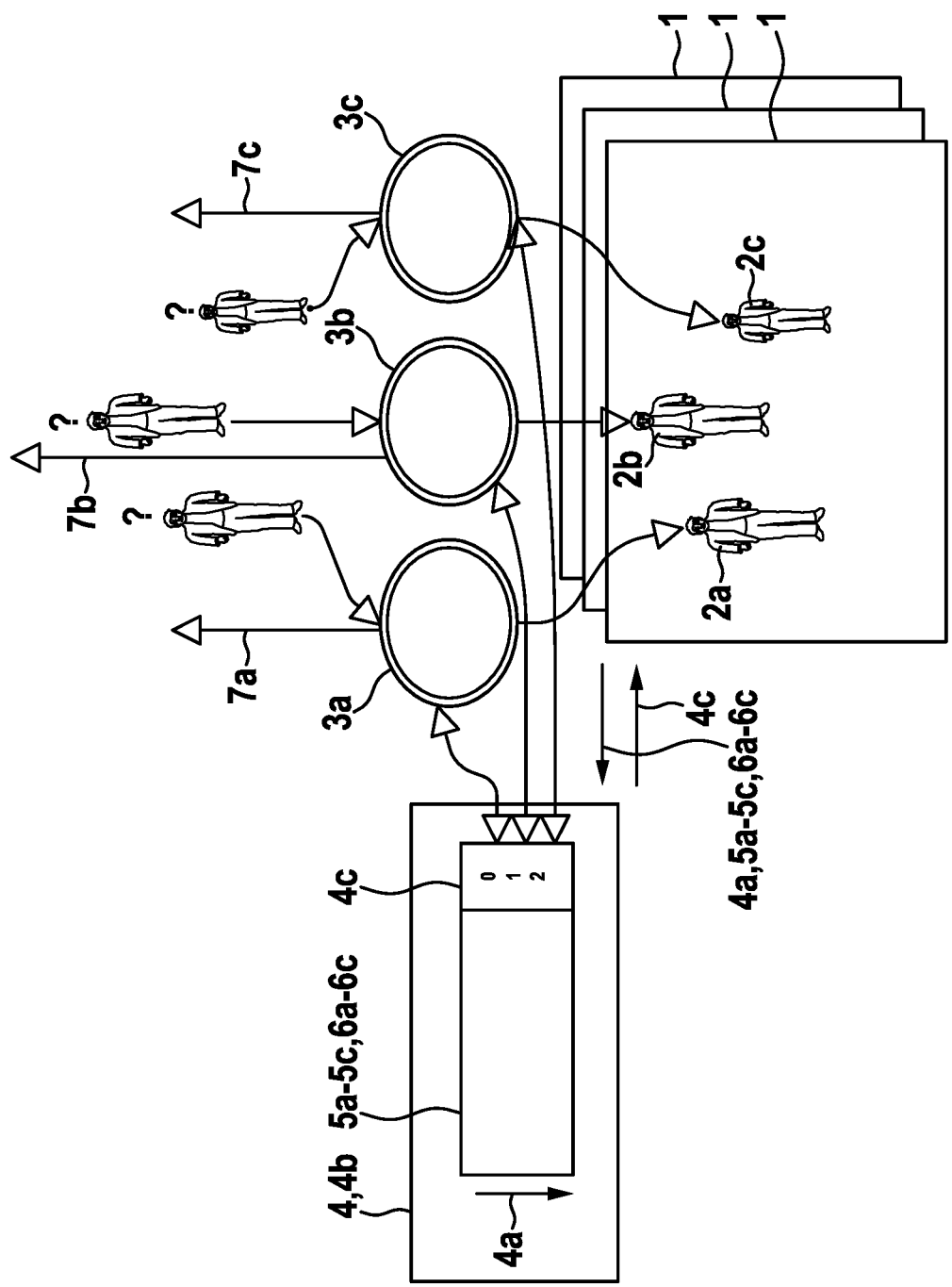
FIG. 2 shows an example of the application of method 100 for tracking three pedestrians 2a through 2c in a sequence of images 1, in accordance with the present invention.

FIG. 2 schematically shows an example of an application of method 100 for tracking three pedestrians 2a through 2c in a sequence of images 1. In response to three objects 2a through 2c having been recognized in first image 1 of the sequence, a separate neural network 3a through 3c is applied to the tracking and characterizing of each individual object 2a through 2c. In this example, each of these networks 3a through 3c has the task of establishing whether particular object 2a through 2c is a pedestrian, and identifying this pedestrian, optionally as a specific pedestrian of multiple possible pedestrians; and tracking the path of particular object 2a through 2c, based on the image sequence.

Memory 4 is an associative memory in which numerical identifications 0, 1, 2 are already pre-entered as data 4c. Associations with processing products 5a through 5c, 6a through 6c of the neural networks are stored in memory 4 during the training of neural networks 3a through 3c. This means that, for example, a neural network 3a through 3c may query memory 4, using a processing product 5a through 5c generated at that moment, and as a response obtains the identification of that pedestrian who is being tracked at that moment by particular neural network 3a through 3c.

Numerical identifications 0, 1, 2 in memory 4 do not necessarily have to remain fixed during the training. Rather, for example identification 1 may also be changed to 1.5 during the training, thus providing an indication to the next querying neural network that the correct identification is probably 1 or 2. Querying neural network 3a through 3c must then decide between 1 or 2.

What is claimed is:

1. A method for tracking and/or characterizing multiple objects in a sequence of images, the method comprising the following steps:

assigning a respective neural network to each object of the multiple objects to be tracked;

providing a memory that is shared by all neural networks, and that is configured to map an address vector of address components, via differentiable operations, onto one or multiple memory locations, and to read data from the memory locations or write data into the memory locations;

supplying images from the sequence, and/or details of the images from the sequence, to each respective neural network;

during the processing of each image and/or image detail by a neural network of the neural networks, generating an address vector from at least one processing product of the neural network;

based on the address vector, writing at least one further processing product of the neural network into the shared memory, and/or reading out data from the shared memory and further processing the read out data by the neural network; and delivering, as output, by each respective neural network of the neural networks, positions of the assigned object in the images or image details supplied to the respective neural network, and/or information concerning a behavior or other sought properties of the assigned object.

2. The method as recited in claim 1, wherein the processing product from which the address vector is generated represents visual features that are recognized in the object to be tracked to which the neural network is assigned.

3. The method as recited in claim 1, wherein the shared memory is an associative memory in which data are storable in association with processing products of the neural networks.

4. The method as recited in claim 3, wherein within the associative memory is pre-populated with identifications of objects and/or with data that characterize a behavior or other sought properties of objects.

5. The method as recited in claim 1, wherein during the further processing, the neural network combines the read out data from the shared memory with at least one processing product of the neural network.

6. The method as recited in claim 1, wherein at least one first and one second neural network of the neural networks contain mutually corresponding sequences of layers in which particular neurons or other processing units are organized, wherein:
the first neural network writes a processing product from a first layer into one or multiple memory locations of the shared memory, and
the second neural network further processes data, read from the one or multiple memory locations, in a second layer that follows the first layer in the sequence.

7. The method as recited in claim 1, wherein the sequence of images includes images of a traffic situation that has been recorded using at least one sensor that is carried along by a vehicle.

8. The method as recited in claim 7, wherein the outputs of the neural networks are combined into an overall assessment of the traffic situation.

9. The method as recited in claim 7, wherein an activation signal for the vehicle is generated from the outputs of the neural networks and/or from an overall assessment of the traffic situation generated from the outputs of the neural networks, and the vehicle is activated using the activation signal.

10. The method as recited in claim 1, wherein the sequence of images includes images that have been recorded during a visual observation of a monitored area.

11. A non-transitory machine-readable data medium on which is stored a computer program for tracking and/or characterizing multiple objects in a sequence of images, the computer program, when executed by one or more computers, causing the one or more computers to perform the following steps:

assigning a respective neural network to each object of the multiple objects to be tracked;

providing a memory that is shared by all neural networks, and that is configured to map an address vector of address components, via differentiable operations, onto one or multiple memory locations, and to read data from the memory locations or write data into the memory locations;

supplying images from the sequence, and/or details of the images from the sequence, to each respective neural network;

during the processing of each image and/or image detail by a neural network of the neural networks, generating an address vector from at least one processing product of the neural network;

based on the address vector, writing at least one further processing product of the neural network into the shared memory, and/or reading out data from the shared memory and further processing the read out data by the neural network; and delivering, as output, by each respective neural network of the neural networks, positions of the assigned object in the images or image details supplied to the respective neural network, and/or information concerning a behavior or other sought properties of the assigned object.

12. A system, comprising:
one or multiple computers configured to track and/or characterize multiple objects in a sequence of images, the one or multiple computers configured to:
assign a respective neural network to each object of the multiple objects to be tracked;
provide a memory that is shared by all neural networks, and that is configured to map an address vector of address components, via differentiable operations, onto one or multiple memory locations, and to read data from the memory locations or write data into the memory locations;
supply images from the sequence, and/or details of the images from the sequence, to each respective neural network;
during the processing of each image and/or image detail by a neural network of the neural networks, generate an address vector from at least one processing product of the neural network;
based on the address vector, write at least one further processing product of the neural network into the shared memory, and/or read out data from the shared memory and further processing the read out data by the neural network; and
deliver, as output, by each respective neural network of the neural networks, positions of the assigned object in the images or image details supplied to the respective neural network, and/or information concerning a behavior or other sought properties of the assigned object.

* * * * *